US011481259B2

(12) United States Patent
Baughman et al.

(10) Patent No.: US 11,481,259 B2
(45) Date of Patent: Oct. 25, 2022

(54) DISTRIBUTING COMPUTATION WORKLOADS BASED ON CALCULATED COMPUTE GRAVITY WITHIN DIFFERING COMPUTING PARADIGMS

(71) Applicant: International Business Machines Corporation, Armonk, NY (US)

(72) Inventors: Aaron K. Baughman, Cary, NC (US); Stephen C. Hammer, Marietta, GA (US); Gray Cannon, Miami, FL (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 16/736,449

(22) Filed: Jan. 7, 2020

(65) Prior Publication Data
US 2021/0208943 A1 Jul. 8, 2021

(51) Int. Cl.
*G06F 9/50* (2006.01)
*G06F 8/60* (2018.01)
*G06N 20/00* (2019.01)

(52) U.S. Cl.
CPC .............. *G06F 9/5044* (2013.01); *G06F 8/60* (2013.01); *G06N 20/00* (2019.01)

(58) Field of Classification Search
CPC ........ G06F 9/5044; G06F 8/60; G06F 9/5055; G06F 8/61; G06N 20/00; G06N 10/80
See application file for complete search history.

(56) References Cited

U.S. PATENT DOCUMENTS 9,258,765 B1 2/2016 daCosta
9,507,630 B2 11/2016 Addepalli et al.
(Continued)

FOREIGN PATENT DOCUMENTS

CN 105610944 A 5/2016
CN 107682416 A 2/2018
CN 107872539 A 4/2018

OTHER PUBLICATIONS

V. K. Naik, P. Garbacki, K. Kummamuru and Yong Zhao, "On-line evolutionary resource matching for job scheduling in heterogeneous grid environments," 12th International Conference on Parallel and Distributed Systems—(ICPADS'06), 2006, pp. 6 pp. -, doi: 10.1109/ICPADS.2006.72. (Year: 2006).*
(Continued)

Primary Examiner — Jorge A Chu Joy-Davila
(74) Attorney, Agent, or Firm — Yee & Associates, P.C.

(57) ABSTRACT

Distributing computation workload among computing nodes of differing computing paradigms is provided. Compute gravity of each computing node in a cloud computing paradigm and each computing node in a client network computing paradigm within an Internet of Systems is calculated. Each component part of an algorithm is distributed to an appropriate computing node of the cloud computing paradigm and client network computing paradigm based on calculated compute gravity of each respective computing node within the Internet of Systems. Computation workload of each component part of the algorithm is distributed to a respective computing node of the cloud computing paradigm and the client network computing paradigm having a corresponding component part of the algorithm for processing.

24 Claims, 7 Drawing Sheets

(56) References Cited

U.S. PATENT DOCUMENTS

| | | | |
|---|---|---|---|
| 10,162,362 B2 | 12/2018 | Tsai et al. | |
| 10,397,039 B2 | 8/2019 | Zhang et al. | |
| 2005/0228852 A1* | 10/2005 | Santos | G06F 9/5005 709/200 |
| 2011/0022706 A1* | 1/2011 | Borghetti | G06F 9/505 709/224 |
| 2012/0066395 A1* | 3/2012 | Ellis | G06F 9/5072 709/226 |
| 2014/0136952 A1 | 5/2014 | Zhu et al. | |
| 2015/0143366 A1* | 5/2015 | Suragi Math | G06F 9/45533 718/1 |
| 2015/0161150 A1* | 6/2015 | Goering | G06F 16/29 709/224 |
| 2016/0179063 A1* | 6/2016 | De Baynast De Septfontaines | G05B 15/02 700/11 |
| 2016/0306673 A1* | 10/2016 | You | G06F 9/5044 |
| 2017/0185452 A1 | 6/2017 | Cao et al. | |
| 2017/0337091 A1* | 11/2017 | Liu | H04L 67/12 |
| 2017/0357539 A1 | 12/2017 | Dadashikelayeh et al. | |
| 2019/0249534 A1* | 8/2019 | Hoeink | G01V 1/50 |
| 2019/0317818 A1* | 10/2019 | Krishna Rao | H04L 67/10 |
| 2020/0314204 A1* | 10/2020 | Gesswein | H04L 41/22 |
| 2021/0021130 A1* | 1/2021 | Farrokhabadi | H02J 3/06 |
| 2021/0357797 A1* | 11/2021 | Karalekas | G06N 10/00 |

OTHER PUBLICATIONS

Hong et al., "Resource Management in Fog/Edge Computing: A Survey," ACM Computing Surveys (CSUR), vol. 52, Issue 5, Oct. 2019, New York, NY, 22 pages. arxiv.org/pdf/1810.00305.pdf.

Anonymous, "Database Tables Decomposition and Re-Aggregation with Data Fogging and Security Purposes," An IP.com Prior Art Database Technical Disclosure, IP.com No. IPCOM000200475D, Oct. 15, 2010, 4 pages.

Pignataro et al., "Fog Based Attestation—Inline Dataplane Based Integrity Validation and Event Based Attestation Query," An IP.com Prior Art Database Technical Disclosure, IP.com No. IPCOM000245102D, Feb. 8, 2016, 8 pages.

Mahmud et al., "Quality of Experience (QoE)-Aware Placement of Applications in Fog Computing Environments," Journal of Parallel and Distributed Computing, vol. 132, Oct. 2019, pp. 190-203. doi.org/10.1016/j.jpdc.2018.03.004.

Pramanik et al., "Chapter 7: Processing IoT Data: From Cloud to Fog—It's Time to Be Down to Earth," IGI Global, copyright 2018, 26 pages. researchgate.net/publication/325441470.

Mell et al., "The NIST Definition of Cloud Computing," Computer Security Division, National Institute of Standards and Technology, Jan. 2011, 7 pages.

Dang et al., "A Data Protection Model for Fog Computing," 2017 Second International Conference on Fog and Mobile Edge Computing (FMEC), May 8-11, 2017, Valencia, Spain, pp. 32-38.

Hong, "From Cloud Computing to Fog Computing: Unleash the Power of Edge and End Devices," 2017 IEEE 9th International Conference on Cloud Computing Technology and Science (CloudCom), Dec. 28, 2017, Hong Kong, China, pp. 331-334.

Yuan et al., "An Improved Fast Search and Find of Density Peaks-Based Fog Node Location of Fog Computing System," 2017 IEEE International Conference on Internet of Things (iThings) and IEEE Green Computing and Communications (GreenCom) and IEEE Cyber, Physical and Social Computing (CPSCom) and IEEE Smart Data (SmartData), Feb. 1, 2018, Exeter, UK, pp. 635-642.

PCT International Search Report and Written Opinion, dated Mar. 30, 2021, regarding Application No. PCT/IB2020/062205, 10 pages.

Segura et al., Providing Computing Services through Mobile Devices in a Collaborative Way—A Fog Computing Case Study, MSWiM '17: Proceedings of the 20th ACM International Conference on Modeling, Analysis and Simulation of Wireless and Mobile Systems, Nov. 2017, Miami, Florida, pp. 117-121.

Xia et al., "Combining hardware nodes and software components ordering-based heuristics for optimizing the placement of distributed IoT applications in the fog," SAC '18: Proceedings of the 33rd Annual ACM Symposium on Applied Computing, Apr. 2018, pp. 751-760.

Saurez et al., "Eemo Abstract: Fog Computing for Improving User Application Interaction and Context Awareness: Demo Abstract," IoTDI '17: Proceedings of the Second International Conference on Internet-of-Things Design and Implementation, Apr. 2017, Pittsburgh, Pennsylvania, pp. 281-282.

\* cited by examiner

DISTRIBUTING COMPUTATION WORKLOADS BASED ON CALCULATED COMPUTE GRAVITY WITHIN DIFFERING COMPUTING PARADIGMS

BACKGROUND

1. Field

The disclosure relates generally to content delivery networks and more specifically to calculating compute gravity of each computing node within differing computing paradigms of an Internet of Systems in order to distribute computation workload of a large application with complex artificial intelligence components among the computing nodes of the differing computing paradigms.

2. Description of the Related Art

A content delivery network refers to a geographically distributed group of servers that work together to provide fast delivery of data content. A content delivery network allows for the quick transfer of assets needed for loading data content, such as, for example, HTML pages, JavaScript files, stylesheets, images, videos, and the like. The popularity of content delivery network services continues to grow and currently a majority of web traffic is served through content delivery networks, including traffic from major websites, such as, for example, social media websites.

While a content delivery network does not host content and cannot replace the need for web hosting, a content delivery network does help cache content at the network edge, which improves website performance. Many websites struggle to have their performance needs met by traditional hosting services, which is why these websites opt for content delivery networks. By utilizing caching to reduce hosting bandwidth, helping to prevent interruptions in service, and improving security, content delivery networks are a popular choice to relieve some of the issues associated with traditional web hosting.

A content delivery network locates servers at exchange points between different networks. These exchange points are the primary locations where different data providers connect in order to provide each other access to traffic originating on their different networks. A content delivery network edge server is a computer that exists at the logical extreme or edge of the network. An edge server often serves as the connection between the different networks. A primary purpose of a content delivery network edge server is to cache data content as close as possible to a requesting client device, thereby reducing latency and improving load times.

Fog computing is an architecture that uses edge servers to perform a substantial amount of computation, storage, and communication. Fog networking consists of a control plane and a data plane. For example, on the data plane, fog computing enables computing services to reside at the edge of the network as opposed to servers in a datacenter. Compared to cloud computing, fog computing emphasizes proximity to end-users and client devices, dense geographical distribution and local resource pooling, latency reduction and backbone bandwidth savings to achieve better quality of service, and edge analytics/stream mining, which results in a superior user-experience. Fog computing facilitates the operation of compute, storage, and networking services between endpoint devices and cloud computing datacenters. While edge computing is typically referred to the location where services are instantiated, fog computing implies distribution of the communication, computation, storage resources, and services on or close to devices and systems in the control of end-users.

Large scale computing systems with complex data processing pipelines generally run on a hybrid cloud. A data processing pipeline is a set of data processing devices connected in series, where the output of one device is the input of the next device in the series. Ephemeral services are available through the hybrid cloud as stateless microservices that accept payloads of data. Platform as a Service, such as, for example, Kubernetes with Docker, provides much of the compute resources for these compute intensive applications. Other computer algorithms that need high Input/Output, network bandwidth, and specialized hardware requirements require Infrastructure as a Service or sharable machines with virtual machines where traditional Kubernetes cannot supply. However, the traditional cloud computing paradigm breaks down with high user demand.

In these cases of high use demand, origin servers are shielded with content delivery network edge servers. The edge servers provide a web acceleration tier to server static content. However, artificial intelligence-based applications and other dynamic content generation platforms create petabytes of data every day. The volume of information is representative with the combinatorial explosion of the feature space. The combination of billions of requests and dynamically generated data makes content delivery network edge computing and hybrid cloud computing inadequate.

SUMMARY

According to one illustrative embodiment, a computer-implemented method for distributing computation workload among computing nodes of differing computing paradigms is provided. Compute gravity of each computing node in a cloud computing paradigm and each computing node in a client network computing paradigm within an Internet of Systems is calculated. Each component part of an algorithm is distributed to an appropriate computing node of the cloud computing paradigm and client network computing paradigm based on calculated compute gravity of each respective computing node within the Internet of Systems. Computation workload of each component part of the algorithm is distributed to a respective computing node of the cloud computing paradigm and the client network computing paradigm having a corresponding component part of the algorithm for processing. According to other illustrative embodiments, a computer system and computer program product for distributing computation workload among computing nodes of differing computing paradigms are provided.

According to the different illustrative embodiments results of each respective computation workload corresponding to each component part of the algorithm are cached on content delivery network edge servers that provide the results to other client computing nodes without repeating computations. Further, the different illustrative embodiments identify component parts of the algorithm, which is located in the cloud computing paradigm of the Internet of Systems. Furthermore, the different illustrative embodiments receive an input to deploy a component part of the algorithm in the Internet of Systems and calculate the compute gravity of each computing node in the cloud computing paradigm and each computing node in the client network computing paradigm with regard to the component part of the algorithm to be deployed in the Internet of Systems. Then, the different illustrative embodiments determine a computing node having a highest compute gravity score in the Internet of Systems for deploying the component part of the algorithm based on the compute gravity corresponding to each computing node in the cloud computing paradigm and each computing node in the client network computing paradigm and deploy the component part of the algorithm to the computing node having the highest compute gravity score in the Internet of Systems.

As a result, the different illustrative embodiments provide a technical effect and practical application in the field of data processing by calculating compute gravity of each computing node within differing computing paradigms of the Internet of Systems to distribute computation workload of the component parts of the algorithm among the computing nodes of the differing computing paradigms. Thus, advantages of the different illustrative embodiments include decreased compute node workload within the differing computing paradigms, decreased network latency, decreased load times, increased data transport speed and performance, and decreased response times to user requests.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

Figure 1:
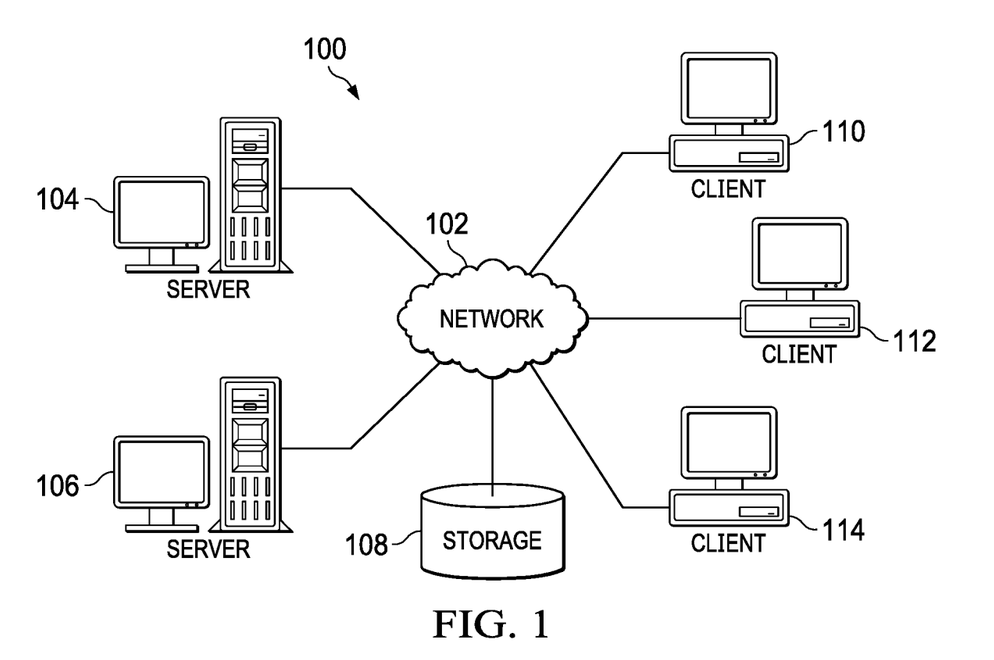
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices, such as, for example, an Internet of Systems, in which the illustrative embodiments may be implemented. Network data processing system 100 contains network 102, which is the medium used to provide communications links between the computers, data processing systems, and other devices connected together within network data processing system 100. Network 102 may be, for example, a content delivery network that includes edge servers with connections such as wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, artificial intelligence data services and the like, to client devices. Also, it should be noted that server 104 and server 106 may each represent multiple server computers, such as, for example, centralized classical and quantum computers in a cloud computing paradigm or environment.

Client 110, client 112, and client 114 also connect to network 102. Clients 110, 112, and 114 are clients of server 104 and server 106. Clients 110, 112, and 114 represent a plurality of client-side computing nodes or devices within a client network computing paradigm or environment. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, smart homes, smart vehicles, gaming devices, kiosks, and the like, with wire or wireless communication links to network 102. Users of clients 110, 112, and 114 may utilize clients 110, 112, and 114 to request the services provided by server 104 and server 106.

Storage 108 is a network storage device capable of storing any type of data in a structured format or an unstructured format. In addition, storage 108 may represent a plurality of network storage devices. Further, storage 108 may store artificial intelligence applications or computer algorithms that have a plurality of component parts, identifiers and network addresses of the plurality of components parts of each respective artificial intelligence application or computer algorithm, computational complexity and compute requirements of each respective component part of each respective artificial intelligence application or algorithm, and the like. Furthermore, storage 108 may store other types of data, such as authentication or credential data that may include user names, passwords, and biometric data associated with client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
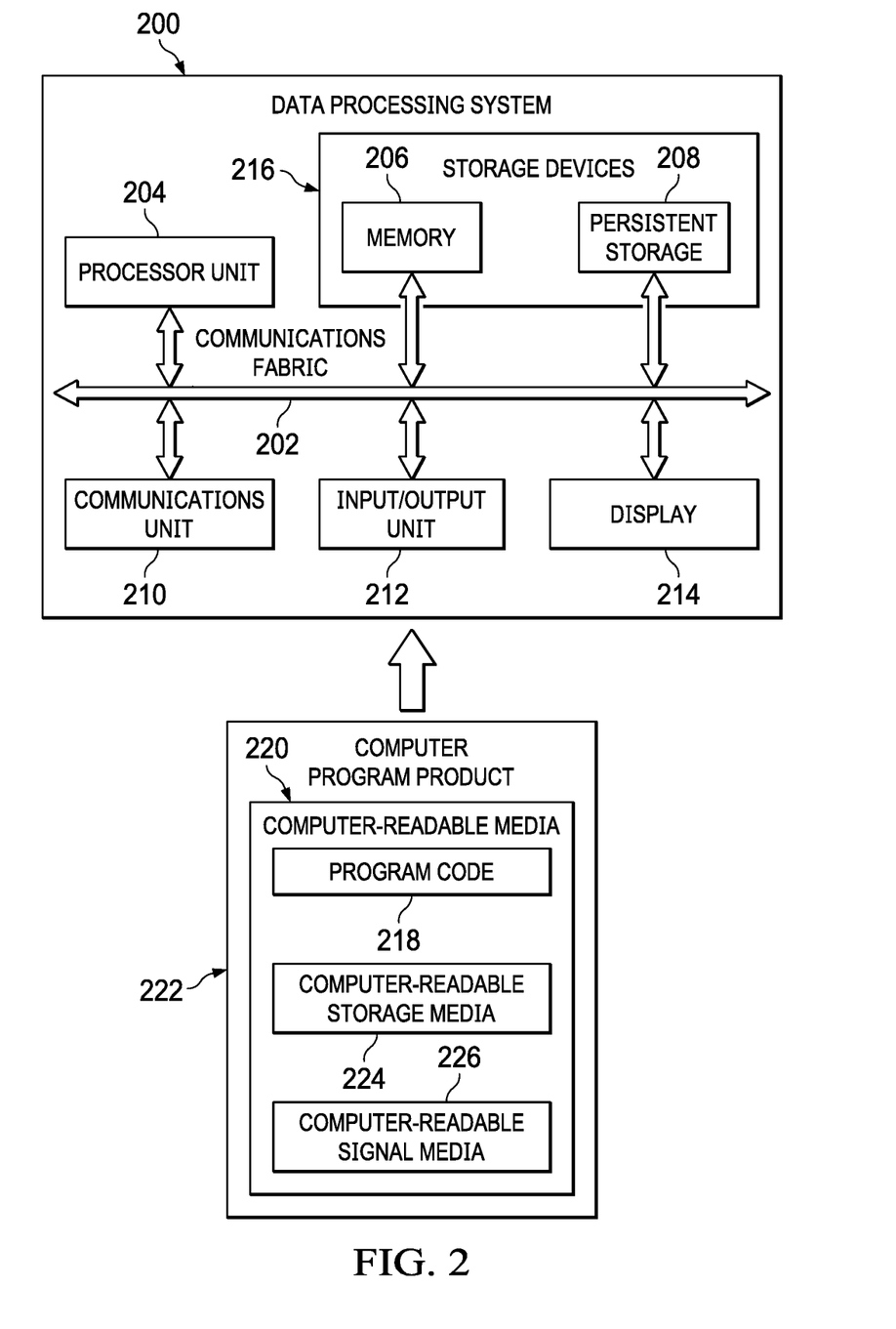
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a data processing system may be downloaded over a network from the data processing system to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 224 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
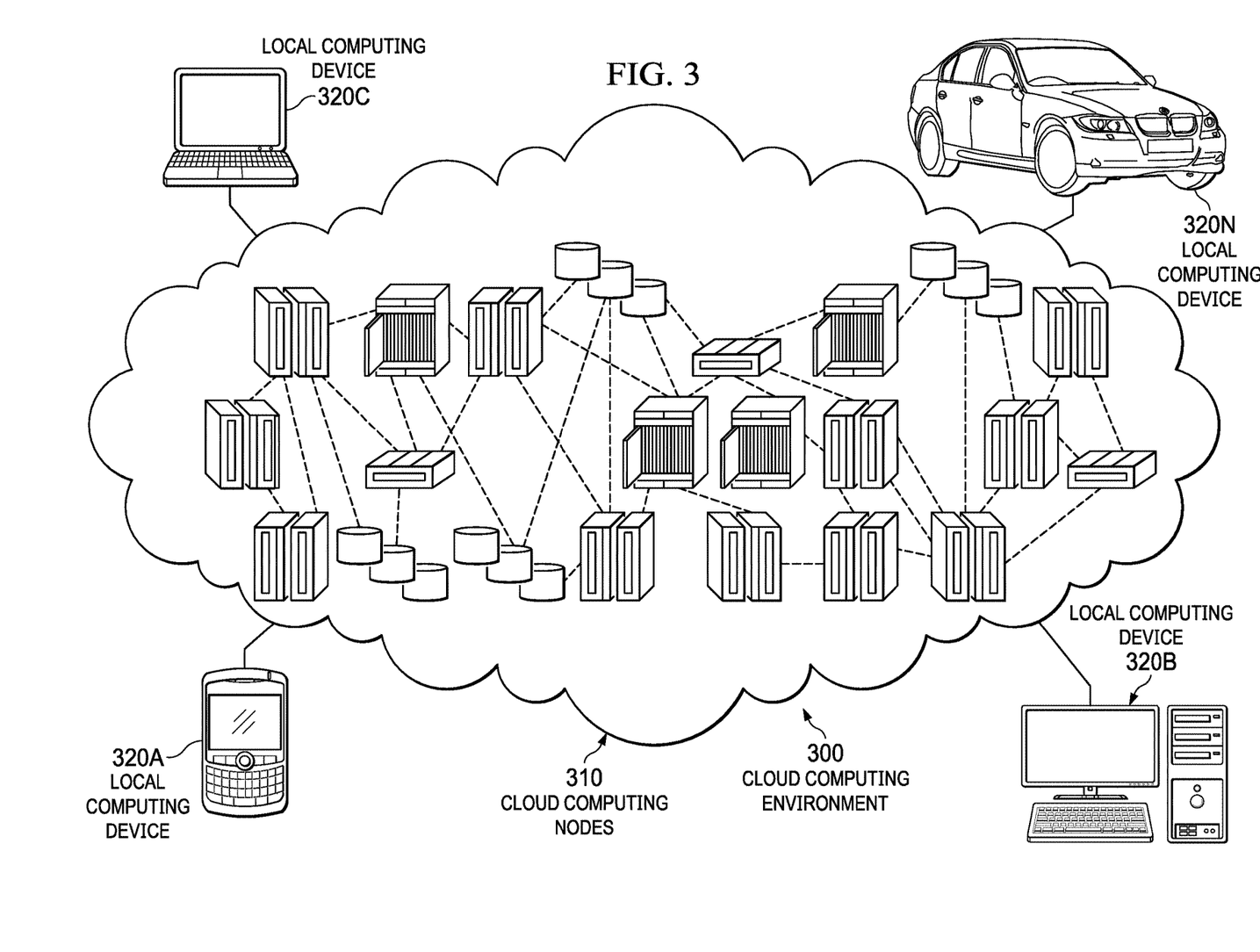
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1 and may include classical and quantum computers. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
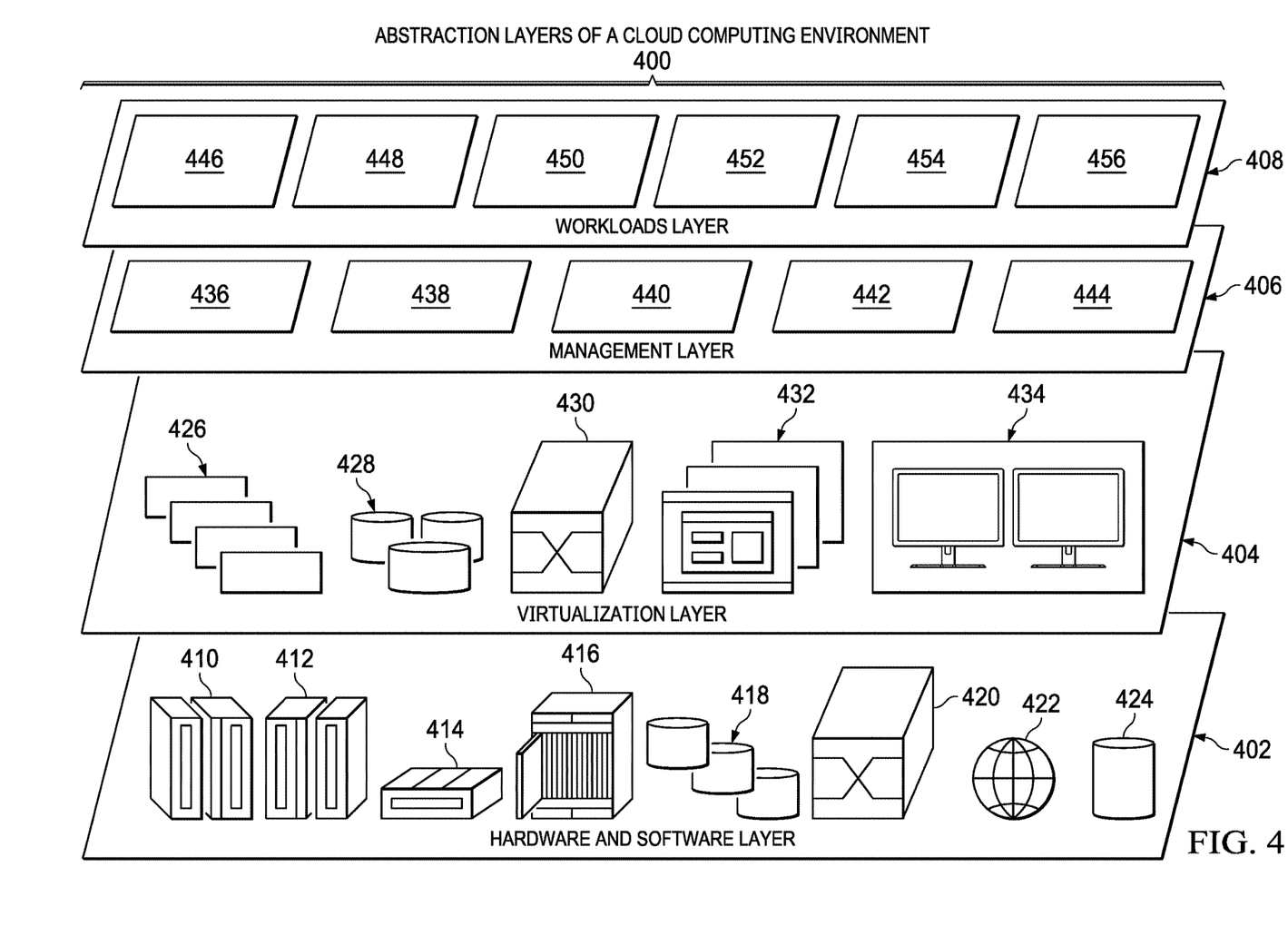
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and computational workload distribution management 456.

Fog computing gravity components, such as, for example, Internet of Things, can suggest which portions of a computer algorithm can be split to differing computing paradigms. It should be noted that steps of a computer algorithm can run in parallel, on specialized hardware, and the like. Illustrative embodiments calculate fog computing gravity so that illustrative embodiments can push computer algorithms and corresponding static data to client device edges for computing. The mobilization of algorithms to a client device edge with diverse programming language, such as, for example, Swift, C#, or JavaScript, creates a pipeline of fog computing.

Illustrative embodiments distribute a computer algorithm or component parts of an algorithm out to client device edges so that each client-side edge computer can execute a portion of the algorithm's computational workload and then cache a result of that portion of the computation workload on a content delivery network edge server for other client computers to utilize without repeating the computations. Illustrative embodiments split and transport an algorithm based on fog computing gravity. Fog computing gravity is the pull of a computational workload to an edge computing node or device based on fit of that particular computational workload to that particular edge computing node.

Illustrative embodiments bridge content delivery network edge computing and hybrid cloud computing within large artificial intelligence applications with highly complex artificial intelligence components. For example, a virtual professional sport application may utilize over 14 artificial intelligence data insight services and custom mathematical and machine learning approaches. Every day, over 10 billion user requests from client end-users may be received by an artificial intelligence data service. Currently, content delivery network edge computing and hybrid cloud computing are not able to pre-compute artificial intelligence data insights due to the combinatorial feature space of optimizing a team lineup, suggesting a player trade, or valuating a team's worth, for example. Illustrative embodiments enable the appropriate component parts of the artificial intelligence application (or computer algorithm) to be pulled up to the client-side edge computer node via fog compute gravity.

Illustrative embodiments can transition other component parts of the computer algorithm to a different paradigm of computing, such as, for example, quantum computing. Quantum computing, within this context, is a compute accelerator for specific problems. Illustrative embodiments may accelerate the application and training of a support-vector machine by using a quantum computer in a cloud computing paradigm. A support-vector machine is a supervised learning model with associated learning algorithms that analyze data used for classification and regression analysis. A neuromorphic computer chip, such as, for example, a True North chip, can accelerate the processing of neural networks, such as artificial intelligence applications.

Illustrative embodiments distribute computation workloads among centralized cloud-based classical computers, centralized cloud-based quantum computers, and client network edge computers within the Internet of Systems comprised of differing computing paradigms. Illustrative embodiments cache results of workload computations from computers of the differing computing paradigms on content delivery network edge servers, which provide the results to client network compute nodes without repeating the computations. When calculating fog compute gravity, illustrative embodiments take into account the complexity of computations associated with different components of the computer algorithm, compute node availability, and computation workload fit to determine which compute node should be tasked with a given computational workload.

Edge computing brings processing closer to the data source. In other words, the data does not need to be sent to a remote cloud or other centralized systems for processing. By eliminating the distance and time it takes to send the data to a centralized system for processing, illustrative embodiments increase data transport speed and performance. It should be noted that data transport includes requests from users.

Fog computing is a standard that defines how edge computing works. Fog computing facilitates the operation of compute, storage, and networking services between edge computing devices and cloud computing devices. Cloud computing provides computing resources as a service, which is a centrally available utility, via the Internet.

Illustrative embodiments utilize fog gravity components, which include compute edge nodes, to determine emergence of algorithm transport pipelines. An algorithm transport pipeline preprocesses data to prepare the data for computation by a target edge computing node or device. Illustrative embodiments utilize algorithm transport pipeline tangents to move specific operators (e.g., artificial intelligence application components) to different computing paradigm components on edge computing devices. In other words, an algorithm transport pipeline tangent moves compute to a different computing paradigm, which requires a radically different data representation. Illustrative embodiments reinforce algorithm transport pipeline affinity based on problem (i.e., computational workload) fit to a content delivery network edge server. Illustrative embodiments also reinforce algorithm transport pipeline affinity based on problem (i.e., computational workload) fit to cloud computing. Illustrative embodiments determine an emergent cloud from a combination of different computing paradigms (e.g., different networks) and edge computing devices that have been used to solve a full compute problem (i.e., results of the full computational workload distributed among the different computing paradigms and edge devices).

Illustrative embodiments place a compute gravity equation on each endpoint device of an Internet of Systems, which is comprised of memory, chips, cores, disk, and the like. Illustrative embodiments assign each potential algorithm transport pipeline a force that pulls at algorithms or parts of algorithms that are located on the cloud. In addition, the cloud has gravity that pulls at the aggregate of algorithms, which is all algorithms running in the Internet of Systems, located on edge servers. An example of the compute gravity equation is as follows:

$$F = \frac{Gm_1 m_2}{r^2},$$

where "F" is the force; "G" is the gravitational constant that is equal to the signature of the client computing, network bandwidth, volume of requests, and size of the data payload; "m" is the mass; and "r" is the radius of the networks; and $$G(\overline{x}, \overline{c}) = \frac{B_t}{B_t + V_r * P_s} + S(\overline{x}, \overline{c}) + P_i,$$

where "x" describes the compute problem (e.g., how many calculations); "c" describes the hardware of the compute node; "$B_t$" is the bandwidth of the network to the compute node; "$V_r$" is the volume of requests; "$P_s$" is the data size; "S" is the signature function that retrieves the signature of a model that is used to solve the compute problem; and "Pi" is the problem importance, which generally is a constant similar to the physical gravity constant of 9.8 m/s$^2$. It should be noted that illustrative embodiments can adjust the problem importance constant to create a relative importance factor for a particular computing node.

An input data schema to vector model, which is input into a deep learning algorithm (e.g., artificial intelligence application) along with the capabilities of a computer node, provides a softmax class and probability for a good mode of computing (i.e., type of computing paradigm, such as quantum computing). Softmax assigns decimal probabilities to each class in a multi-class problem. Those decimal probabilities must add up to 1.0. Softmax is implemented through a neural network layer just before the output layer. The softmax layer must have the same number of nodes as the output layer. Softmax calculates a probability for every possible class. When building a classifier for problems with only one right answer, a softmax is applied to the raw outputs. Applying softmax takes into account all of the elements of the raw output, in the denominator, which means that the different probabilities produced by the softmax function are interrelated.

Each of the computing nodes within the hybrid cloud calculate a compute gravity component score for each artificial intelligence application model or part of a machine learning pipeline (e.g., an ensemble of artificial intelligence application models). The winning compute gravity components (i.e., compute endpoint nodes having a highest compute gravity score) pull the artificial intelligence application model to their locations within the Internet of Systems.

Thus, illustrative embodiments provide one or more technical solutions that overcome a technical problem with distributing computation workload among differing computing paradigms. As a result, these one or more technical solutions provide a technical effect and practical application in the field of data processing by calculating compute gravity of each computing node within differing computing paradigms of an Internet of Systems in order to distribute computation workload of a large application with complex artificial intelligence components among the computing nodes of the differing computing paradigms. Therefore, advantages of illustrative embodiments include decreased compute node workload within the differing computing paradigms, decreased network latency, decreased load times, increased data transport speed and performance, and decreased response times to user requests.

Figure 5:
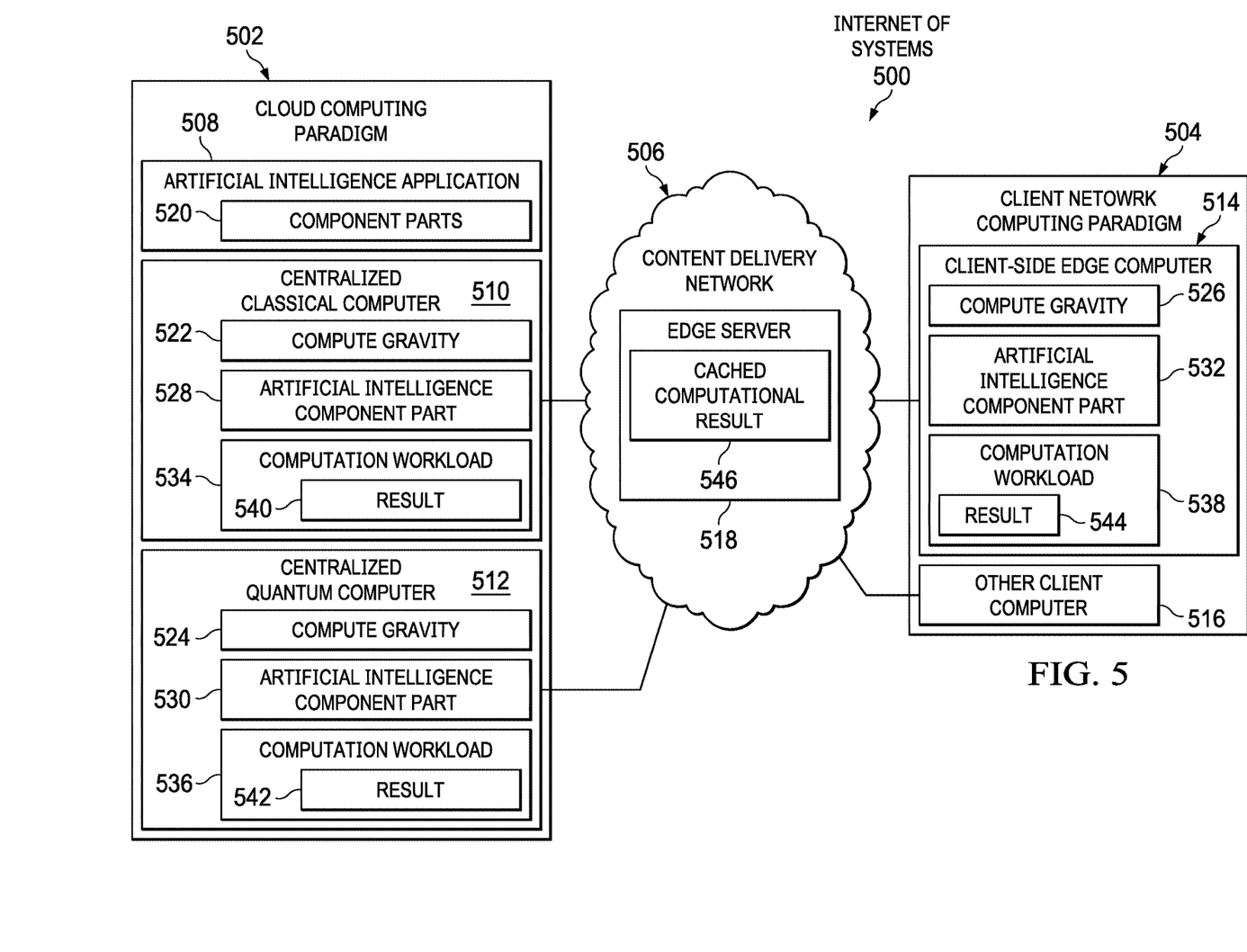
FIG. 5 is a diagram illustrating an example of an Internet of Systems in accordance with an illustrative embodiment.

With reference now to FIG. 5, a diagram illustrating an example of an Internet of Systems is depicted in accordance with an illustrative embodiment. Internet of Systems 500 may be implemented in a network of data processing systems, such as network data processing system 100 in FIG. 1. Internet of Systems 500 is combination of networks, hardware, and software for distributing computation workload of a large application with complex artificial intelligence components among computing nodes of differing computing paradigms within Internet of Systems 500 based on calculated compute gravity corresponding to each respective computing node within the differing computing paradigms.

In this example, Internet of Systems 500 includes cloud computing paradigm 502, client network computing paradigm 504, and content delivery network 506. Cloud computing paradigm 502 includes artificial intelligence application 508, centralized classical computer 510, and centralized quantum computer 512. Artificial intelligence application 508 may represent any type of artificial intelligence application or computer algorithm. Centralized classical computer 510 and centralized quantum computer 512 may be, for example, server 104 and server 106 in FIG. 1. Also, it should be noted that centralized classical computer 510 may represent multiple classical computers and centralized quantum computer 512 may represent multiple quantum computers within cloud computing paradigm 502.

Client network computing paradigm 504 includes client-side edge computer 514 and other client computer 516. Client-side edge computer 514 and other client computer 516 may be, for example, client 110 and client 112 in FIG. 1. In addition, it should be noted that client-side edge computer 514 may represent multiple client-side edge computing nodes and other client computer 516 may represent multiple other client computing nodes within client network computing paradigm 504.

Content delivery network 506 includes edge server 518. Edge server 518 is a computer that exists at the logical edge of content delivery network 506 and serves as a connection point between the differing computing paradigms, cloud computing paradigm 502 and client network computing paradigm 504.

Artificial intelligence application 508 includes component parts 520. Component parts 520 represent a plurality of different software components that comprise artificial intelligence application 508. Each component part of component parts 520 has a different functionality with different computational complexity requiring different compute resources.

Illustrative embodiments distribute the different component parts of artificial intelligence application 508 among the computing nodes of the differing computing paradigms within Internet of Systems 500 based on calculated compute gravity corresponding to each respective computing node within the differing computing paradigms. For example, illustrative embodiments, using a compute gravity equation, such as the compute gravity equation shown above, calculate compute gravity 522 for centralized classical computer 510, compute gravity 524 for centralized quantum computer 512, and compute gravity 526 for client-side edge computer 514 based on, for example, computation complexity corresponding to each of component parts 520 of artificial intelligence application 508, compute node availability, compute node computation workload fit, and the like.

Based on calculated compute gravity 522 of centralized classical computer 510, compute gravity 524 of centralized quantum computer 512, and compute gravity 526 of client-side edge computer 514, illustrative embodiments distribute a particular component part of component parts 520, such as artificial intelligence component part 528, artificial intelligence component part 530, and artificial intelligence component part 532, to centralized classical computer 510, centralized quantum computer 512, and client-side edge computer 514, respectively. Further, based on which particular component part of components parts 520 is located on a particular computing node, such as artificial intelligence component part 528 located on centralized classical computer 510, artificial intelligence component part 530 located on centralized quantum computer 512, and artificial intelligence component part 532 located on client-side edge computer 514, illustrative embodiments distribute a corresponding computation workload to that particular computing node, such as workload 534, workload 536, and workload 538 on centralized classical computer 510, centralized quantum computer 512, and client-side edge computer 514, respectively.

Each respective computation workload distributed on centralized classical computer 510, centralized quantum computer 512, and client-side edge computer 514 generates a computational result, such as result 540, result, 542, and result 544, respectively. Illustrative embodiments cache result 540, result, 542, and result 544 on edge servers, such as cached computational result 546 on edge server 518, within content delivery network 506. It should be noted that cached computational result 546 represents a plurality of cached computational results stored on a plurality of different edge servers within content delivery network 506. Furthermore, illustrative embodiments provide the plurality of cached computational results stored on the plurality of different edge servers to other client computers, such as other client computer 516, so that the other client computers do not have to repeat the computations. Moreover, illustrative embodiments may form an emergent cloud comprised of centralized classical computer 510, centralized quantum computer 512, and client-side edge computer 514 that contributed to generating results of the full computational workload distributed among the differing computing paradigms and computing nodes.

Figure 6:
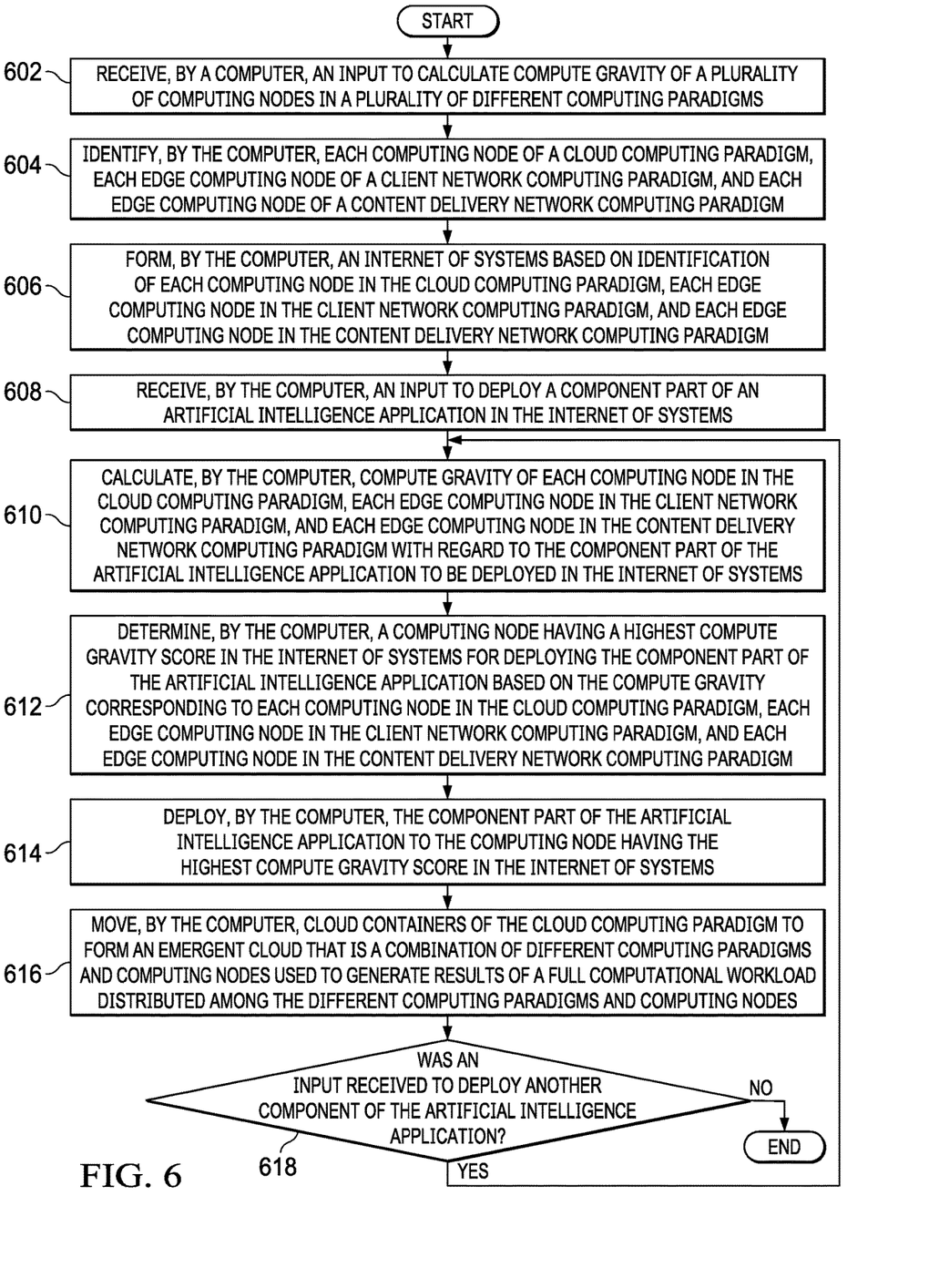
FIG. 6 is a flowchart illustrating a process for deploying an artificial intelligence application within an Internet of Systems in accordance with an illustrative embodiment.

With reference now to FIG. 6, a flowchart illustrating a process for deploying an artificial intelligence application within an Internet of Systems is shown in accordance with an illustrative embodiment. The process shown in FIG. 6 may be implemented in a computer, such as, for example, data processing system 200 in FIG. 2.

The process begins when the computer receives an input to calculate compute gravity of a plurality of computing nodes in a plurality of different computing paradigms (step 602). The computer identifies each computing node of a cloud computing paradigm, each edge computing node of a client network computing paradigm, and each edge computing node of a content delivery network computing paradigm (step 604). The computer forms an Internet of Systems based on identification of each computing node in the cloud computing paradigm, each edge computing node in the client network computing paradigm, and each edge computing node in the content delivery network computing paradigm (step 606).

Subsequently, the computer receives an input to deploy a component part of an artificial intelligence application in the Internet of Systems (step 608). The computer calculates compute gravity of each computing node in the cloud computing paradigm, each edge computing node in the client network computing paradigm, and each edge computing node in the content delivery network computing paradigm with regard to the component part of the artificial intelligence application to be deployed in the Internet of Systems (step 610). The computer determines a computing node having a highest compute gravity score in the Internet of Systems for deploying the component part of the artificial intelligence application based on the compute gravity corresponding to each computing node in the cloud computing paradigm, each edge computing node in the client network computing paradigm, and each edge computing node in the content delivery network computing paradigm (step 612).

The computer deploys the component part of the artificial intelligence application to the computing node having the highest compute gravity score in the Internet of Systems (step 614). In addition, the computer moves cloud containers of the cloud computing paradigm to form an emergent cloud that is a combination of different computing paradigms and computing nodes used to generate results of a full computational workload distributed among the different computing paradigms and computing nodes (step 616). It should be noted that the emergent cloud includes the computing node having the highest compute gravity score.

Afterward, the computer makes a determination as to whether an input was received to deploy another component of the artificial intelligence application in the Internet of Systems (step 618). If the computer determines that an input was received to deploy another component of the artificial intelligence application in the Internet of Systems, yes output of step 618, then the process returns to step 610 where the computer calculates compute gravity of each computing node in the cloud computing paradigm, each edge computing node in the client network computing paradigm, and each edge computing node in the content delivery network computing paradigm with regard to the other component of the artificial intelligence application to be deployed in the Internet of Systems. If the computer determines that an input was not received to deploy another component of the artificial intelligence application in the Internet of Systems, no output of step 618, then the process terminates thereafter.

Figure 7:
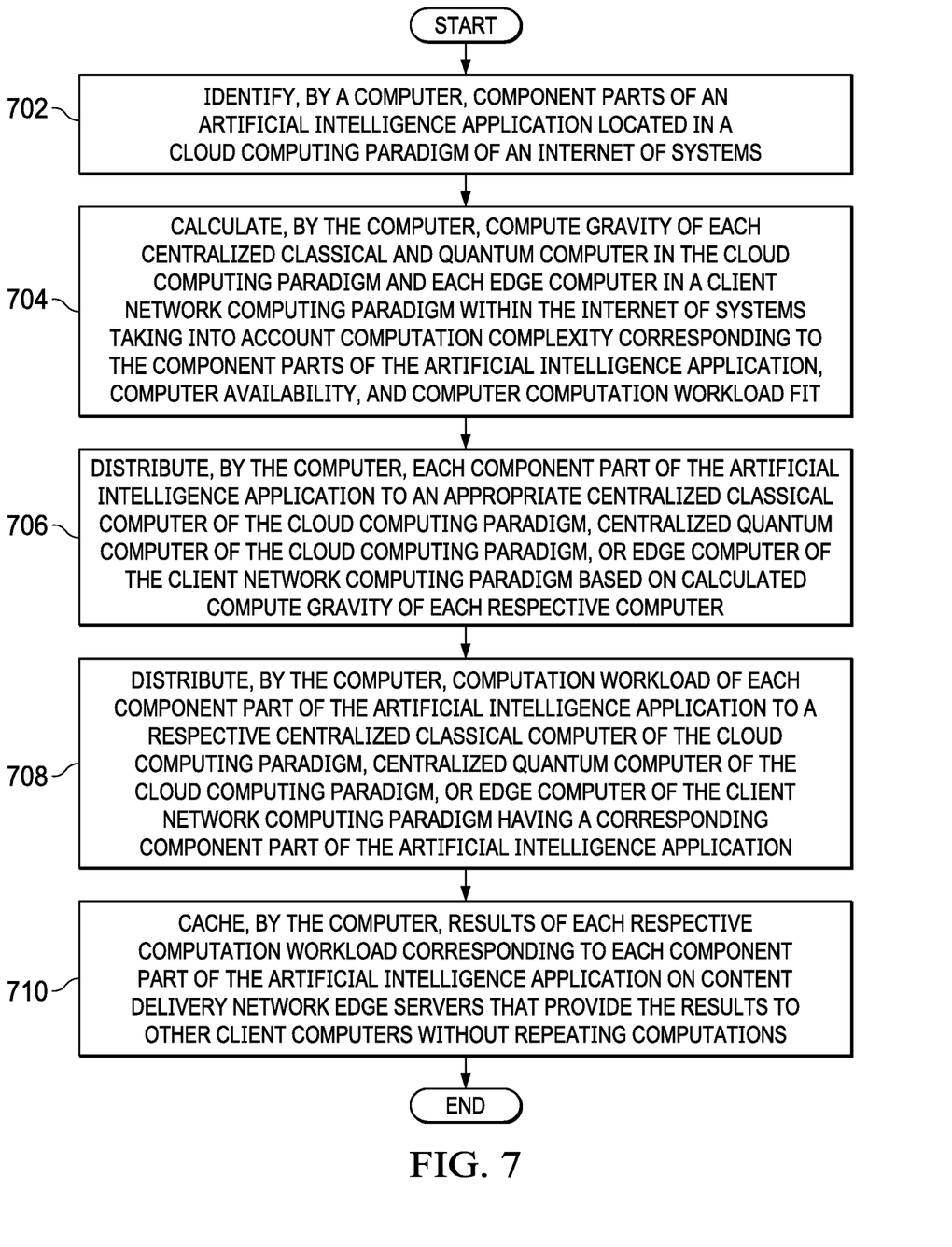
FIG. 7 is a flowchart illustrating a process for distributing computation workload of component parts of an artificial intelligence application based on compute gravity within an Internet of Systems in accordance with an illustrative embodiment.

With reference now to FIG. 7, a flowchart illustrating a process for distributing computation workload of component parts of an artificial intelligence application based on compute gravity within an Internet of Systems is shown in accordance with an illustrative embodiment. The process shown in FIG. 7 may be implemented in a computer, such as, for example, data processing system 200 in FIG. 2.

The process begins when the computer identifies component parts of an artificial intelligence application (or algorithm) located in a cloud computing paradigm of an Internet of Systems (step 702). The computer calculates compute gravity of each centralized classical and quantum computer in the cloud computing paradigm and each edge computer in a client network computing paradigm within the Internet of Systems taking into account computation complexity corresponding to the component parts of the artificial intelligence application, computer availability, and computer computation workload fit (step 704).

The computer distributes each component part of the artificial intelligence application to an appropriate centralized classical computer of the cloud computing paradigm, centralized quantum computer of the cloud computing paradigm, or edge computer of the client network computing paradigm based on calculated compute gravity of each respective computer (step 706). Further, the computer distributes computation workload of each component part of the artificial intelligence application to a respective centralized classical computer of the cloud computing paradigm, centralized quantum computer of the cloud computing paradigm, or edge computer of the client network computing paradigm having a corresponding component part of the artificial intelligence application for processing (step 708).

The computer caches results of each respective computation workload corresponding to each component part of the artificial intelligence application on content delivery network edge servers that provide the results to other client computers without repeating computations (step 710). Thereafter, the process terminates.

Thus, illustrative embodiments of the present invention provide a computer-implemented method, computer system, and computer program product for distributing computation workload of a large application with complex artificial intelligence components among computing nodes of differing computing paradigms within an Internet of Systems based on calculated compute gravity corresponding to each respective computing node within the differing computing paradigms. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
calculating compute gravity of each computing node in a cloud computing paradigm and each computing node in a client network computing paradigm within an Internet of Systems based on computation complexity corresponding to each component part of an algorithm to be distributed within the Internet of Systems, computing node availability, and computing node computation workload fit;
distributing each component part of the algorithm to an appropriate computing node of the cloud computing paradigm and client network computing paradigm based on calculated compute gravity of each respective computing node within the Internet of Systems; and
distributing computation workload of each component part of the algorithm to a respective computing node of the cloud computing paradigm and the client network computing paradigm having a corresponding component part of the algorithm for processing.

2. The method of claim 1 further comprising:
caching results of each respective computation workload corresponding to each component part of the algorithm on content delivery network edge servers that provide the results to other client computing nodes without repeating computations.

3. The method of claim 1 further comprising:
identifying component parts of the algorithm, which is located in the cloud computing paradigm of the Internet of Systems.

4. The method of claim 1 further comprising:
receiving an input to deploy a component part of the algorithm in the Internet of Systems; and
calculating the compute gravity of each computing node in the cloud computing paradigm and each computing node in the client network computing paradigm with regard to the component part of the algorithm to be deployed in the Internet of Systems.

5. The method of claim 4 further comprising:
determining a computing node having a highest compute gravity score in the Internet of Systems for deploying the component part of the algorithm based on the compute gravity corresponding to each computing node in the cloud computing paradigm and each computing node in the client network computing paradigm; and
deploying the component part of the algorithm to the computing node having the highest compute gravity score in the Internet of Systems.

6. The method of claim 1 further comprising:
moving cloud containers of the cloud computing paradigm to form an emergent cloud that is a combination of different computing paradigms and computing nodes used to generate results of a full computational workload distributed among the different computing paradigms and computing nodes.

7. The method of claim 1 further comprising:
identifying each computing node of the cloud computing paradigm, each computing node of the client network computing paradigm, and each edge computing node of a content delivery network computing paradigm; and forming the Internet of Systems based on identification of each computing node in the cloud computing paradigm, each computing node in the client network computing paradigm, and each edge computing node in the content delivery network computing paradigm.

8. The method of claim 1, wherein an algorithm transport pipeline preprocesses data to prepare the data for computation by a target edge computing node, and wherein a force is assigned to the algorithm transport pipeline to pull a particular component part of the algorithm located on the cloud computing paradigm to the target edge computing node.

9. The method of claim 1, wherein computing nodes in the cloud computing paradigm include centralized classical computers and centralized quantum computers, and wherein computing nodes in the client network computing paradigm include edge computers.

10. The method of claim 1, wherein the algorithm is an artificial intelligence application with complex artificial intelligence components.

11. A computer system comprising:
a bus system;
a storage device connected to the bus system, wherein the storage device stores program instructions; and
a processor connected to the bus system, wherein the processor executes the program instructions to:
calculate compute gravity of each computing node in a cloud computing paradigm and each computing node in a client network computing paradigm within an Internet of Systems based on computation complexity corresponding to each component part of an algorithm to be distributed within the Internet of Systems, computing node availability, and computing node computation workload fit;
distribute each component part of the algorithm to an appropriate computing node of the cloud computing paradigm and client network computing paradigm based on calculated compute gravity of each respective computing node within the Internet of Systems; and
distribute computation workload of each component part of the algorithm to a respective computing node of the cloud computing paradigm and the client network computing paradigm having a corresponding component part of the algorithm for processing.

12. The computer system of claim 11, wherein the processor further executes the program instructions to:
cache results of each respective computation workload corresponding to each component part of the algorithm on content delivery network edge servers that provide the results to other client computing nodes without repeating computations.

13. The computer system of claim 11, wherein the processor further executes the program instructions to:
identify component parts of the algorithm, which is located in the cloud computing paradigm of the Internet of Systems.

14. The computer system of claim 11, wherein the processor further executes the program instructions to:
receive an input to deploy a component part of the algorithm in the Internet of Systems; and
calculate the compute gravity of each computing node in the cloud computing paradigm and each computing node in the client network computing paradigm with regard to the component part of the algorithm to be deployed in the Internet of Systems.

15. The computer system of claim 14, wherein the processor further executes the program instructions to:
determine a computing node having a highest compute gravity score in the Internet of Systems for deploying the component part of the algorithm based on the compute gravity corresponding to each computing node in the cloud computing paradigm and each computing node in the client network computing paradigm; and
deploy the component part of the algorithm to the computing node having the highest compute gravity score in the Internet of Systems.

16. The computer system of claim 11, wherein the processor further executes the program instructions to:
move cloud containers of the cloud computing paradigm to form an emergent cloud that is a combination of different computing paradigms and computing nodes used to generate results of a full computational workload distributed among the different computing paradigms and computing nodes.

17. The computer system of claim 11, wherein the processor further executes the program instructions to:
identify each computing node of the cloud computing paradigm, each computing node of the client network computing paradigm, and each edge computing node of a content delivery network computing paradigm; and
form the Internet of Systems based on identification of each computing node in the cloud computing paradigm, each computing node in the client network computing paradigm, and each edge computing node in the content delivery network computing paradigm.

18. A computer program product comprising a computer readable storage medium having program instructions embodied therewith, the program instructions executable by a computer to cause the computer to perform a method comprising:
calculating compute gravity of each computing node in a cloud computing paradigm and each computing node in a client network computing paradigm within an Internet of Systems based on computation complexity corresponding to each component part of an algorithm to be distributed within the Internet of Systems, computing node availability, and computing node computation workload fit;
distributing each component part of the algorithm to an appropriate computing node of the cloud computing paradigm and client network computing paradigm based on calculated compute gravity of each respective computing node within the Internet of Systems; and
distributing computation workload of each component part of the algorithm to a respective computing node of the cloud computing paradigm and the client network computing paradigm having a corresponding component part of the algorithm for processing.

19. The computer program product of claim 18 further comprising:
caching results of each respective computation workload corresponding to each component part of the algorithm on content delivery network edge servers that provide the results to other client computing nodes without repeating computations.

20. The computer program product of claim 18 further comprising:
identifying component parts of the algorithm, which is located in the cloud computing paradigm of the Internet of Systems.

21. The computer program product of claim 18 further comprising:
receiving an input to deploy a component part of the algorithm in the Internet of Systems; and
calculating the compute gravity of each computing node in the cloud computing paradigm and each computing node in the client network computing paradigm with regard to the component part of the algorithm to be deployed in the Internet of Systems.

22. The computer program product of claim 21 further comprising:
determining a computing node having a highest compute gravity score in the Internet of Systems for deploying the component part of the algorithm based on the compute gravity corresponding to each computing node in the cloud computing paradigm and each computing node in the client network computing paradigm; and
deploying the component part of the algorithm to the computing node having the highest compute gravity score in the Internet of Systems.

23. The computer program product of claim 18 further comprising:
moving cloud containers of the cloud computing paradigm to form an emergent cloud that is a combination of different computing paradigms and computing nodes used to generate results of a full computational workload distributed among the different computing paradigms and computing nodes.

24. The computer program product of claim 18 further comprising:
identifying each computing node of the cloud computing paradigm, each computing node of the client network computing paradigm, and each edge computing node of a content delivery network computing paradigm; and
forming the Internet of Systems based on identification of each computing node in the cloud computing paradigm, each computing node in the client network computing paradigm, and each edge computing node in the content delivery network computing paradigm.

* * * * *